US006345807B1

(12) United States Patent
Cacciatore

(10) Patent No.: US 6,345,807 B1
(45) Date of Patent: Feb. 12, 2002

(54) SMALL VEHICLE LIFT

(76) Inventor: Joseph Cacciatore, P.O. Box 1331, Tappahannock, VA (US) 22560

( * ) Notice: Subject to any disclaimer, the term of this patent is extended or adjusted under 35 U.S.C. 154(b) by 0 days.

(21) Appl. No.: 09/590,851

(22) Filed: Jun. 9, 2000

(51) Int. Cl.[7] .................................................. B60P 1/48
(52) U.S. Cl. ...................................... 254/3 B; 254/124
(58) Field of Search ................................ 254/8 R, 8 B, 254/8 C, 10 R, 10 B, 10 C, 3 R, 3 B, 3 C, 133, 134, 88, 124, 90; 211/5, 22

(56) References Cited

U.S. PATENT DOCUMENTS

| | | | | |
|---|---|---|---|---|
| 3,363,778 A | * | 1/1968 | Larsson | 254/124 |
| 3,618,894 A | | 11/1971 | Meyer | |
| 4,088,303 A | * | 5/1978 | Aquila | 254/124 |
| 4,460,158 A | * | 7/1984 | Chiesa et al. | 254/124 |
| 4,901,980 A | * | 2/1990 | Hansen | 254/124 |
| 5,538,389 A | * | 7/1996 | Stone | 254/3 R |
| 5,678,804 A | | 10/1997 | Lintelman et al. | |
| 5,826,857 A | | 10/1998 | Brack et al. | |
| 5,855,359 A | | 1/1999 | Chipperfield | |
| 5,971,360 A | | 10/1999 | Sinsley | |

* cited by examiner

*Primary Examiner*—Robert C. Watson
(74) *Attorney, Agent, or Firm*—Michael I. Kroll

(57) ABSTRACT

The present invention 10 discloses a small vehicle lift generally consisting of a base assembly 14 and a lift platform assembly 16 secured to each other by a pivot pin 18 located at one end of the base 14 within the anti-tilt extension members 20. The lifting action of the platform 16 is angular to the base 14 and is accomplished through a hydraulic lifting device 22 which is pivotally anchored to the base 14 as well as to the lifting platform structure a short distance from the main lift pivot point. When actuated, the hydraulic lift 22 forces the rotation of the platform 16 about the pivot pin to a maximum 60° displacement. Additionally, there is a safety pin 24 mounted on the elevated rear portion 26 of the base that slides in and out and that acts as a safety device in case of hydraulic jack failure when the lift is in full up position. This allows for easy and safe access to the underside of the mower for maintenance and repair.

16 Claims, 14 Drawing Sheets

SMALL VEHICLE LIFT

BACKGROUND OF THE INVENTION

1. Field of the Invention

The present invention relates generally to vehicle repair equipment and, more specifically, to small vehicle lifts. Typical lifting devices in this field lift only a component of the load. The effectiveness, stability and safety of these devices therefore are dependent, to some degree, on the quality of the surface upon which the device is placed. Surface solidity is one characteristic that directly effects the capability and stability of this type of lifting device. This is because their bases are generally of a relatively small surface area and thus the load tends to cause sinking in less than solid surfaces. Because of surface inconsistencies there is also a tendency for these devices to sink unevenly and thus to change their angular orientation as with respect to the surface which leads to instability and unsafe conditions. Grade is another surface factor to consider. Variation of grade between the lifting device and the partial load resting on the surface can also lessen the effective lifting angle thus degrading the lifting effect. This variation can also effect the center of gravity of the load as it is being lifted to the point where the device is not safe to use. All of the above shortcomings associated with prior art have been thoroughly addressed by the present invention.

The present invention, the Mower Lift, is a completely self-contained lifting device, i.e., the equipment being lifted is completely contained within the device and the lifting action is relative to the base, which completely supports the load. There is no tendency for dangerous differences to occur between the load and the lifting device since there is no load sharing between the device and the surface on which the load rests. This completely eliminates instability and unsafe conditions caused by less-than-perfect surface conditions. Even normal differences in grade do not compromise the stability, safety or lifting capability of the present invention as they do in devices typical of prior art.

The Mower Lift is basically a two piece construction: a base and a lift platform. The load rests entirely on the lift platform, which is secured to the base by a pivot pin at one end. The lifting action of the platform is angular to the base and is accomplished through a hydraulic lifting device which is pivotally anchored to the base as well as to the lifting platform structure a short distance from the pivot point. When actuated, the hydraulic lift forces the rotation of the platform about the pivot pin to a maximum 60° displacement. This generous displacement allows for easy and safe access to the underside of the mower for maintenance and repair.

2. Description of the Prior Art

There are other small vehicle lifting devices designed for facilitating maintenance repair activity. Typical of these is U.S. Pat. No. 5,971,360 issued to Wayne Sinsley on Oct. 26, 1999.

Another patent was issued to Gerald N. Chipperfield on Jan. 5, 1999 as U.S. Pat. No. 5,855,359. Yet another U.S. Pat. No. 5,826,857 was issued to Billy M. Brack on Oct. 27, 1998 and still yet another was issued on Oct. 21, 1997 to Timothy Craig Lintelman and James Thomas Hafendorfer as U.S. Pat. No. 5,678,804.

Another patent was issued to Gerald R. Meyer on Nov. 9, 1971 as U.S. Pat. No. 3,618,894.

A lifting and support device for elevating self-propelled lawn mowers or lawn tractors comprising, a support frame having wheels with adjustable equipment engagement and stabilization brackets extending therefrom. An activation bar handle extending from said support frame in an angular relation thereto so that the elevated lawn mower equipment moves past a vertical lift line for stabilization.

A new combination wheel ramp and jack for raising a wheel and a corresponding part of the vehicle so that access to the underside of the vehicle is more easily achieved. The inventive device includes a lower support base assembly, and upper wheel platform assembly, a scissors assembly connecting the support base assembly and the wheel platform assembly and causing vertical movements of the wheel platform assembly when actuated, and a screwjack assembly connected to the scissors assembly for actuating the scissors assembly and thus causing vertical movement of the wheel platform assembly.

A commercial mower support stand includes a cradle at its top that is adapted to engage a lifting bar that is secured to the front or rear end of a lawn mower, golf cart, or other light vehicle. The cradle is supported by a plurality of upstanding rigid legs that are secured at their respective lowermost ends to a base plate. A pair of laterally spaced apart support legs support a forward end of the base plate and a pair of laterally spaced apart wheels support the rearward end of the base plate when the stand is in its upright position on a support surface. A tube mounted at a predetermined angle to the base plate slidingly receives an elongate leverage handle that is used to manipulate the stand as needed when lifting and lowering a preselected end of a light vehicle. The stand includes storage receptacles for the leverage handle, replacement mower blades, a lubrication gun, or other items and tools.

A lifting or jacking device for the lifting of lawn mowing equipment comprising an axle, a support element secured to the axle at approximately a 90° angle from the extended vertical element, and a gripping piece, preferably a pair of gripping teeth secured to one end of the support bar. Preferably a foot assist bar is also secured to the extended vertical element to assist the lever element in raising the lawn mowing equipment. In addition, there is preferably secured to the device an extendable safety arm which is extendable from the support element to maintain the lifting device in a fixed position after the lawn mowing equipment has been lifted. Also preferably, the extended lever bar is divided into an upper and lower section, the upper section of which may be rotated to assist in the movement and storage of the lifting or jacking device.

A hydraulic cylinder on a wheeled carriage vertically swings a lever. A chain suspended from the lever adjustably engages one end of a lift beam. The beam has a ground engaging roller at its opposite end, and a vehicle-engaging seat located between the ends of the beam rises as the lever tilts the beam to jack the vehicle from a point remote from the carriage.

While these lifting devices may be suitable for the purposes for which they were designed, they would not be as suitable for the purposes of the present invention, as hereinafter described.

SUMMARY OF THE PRESENT INVENTION

The present invention discloses a small vehicle lift generally consisting of a base assembly and a lift platform assembly secured to each other by a pivot pin located at one end of the base within the anti-tilt extension members. The lifting action of the lift platform is angular to the base and is accomplished through a hydraulic lifting device which is pivotally anchored to the base as well as to the lifting platform structure a short distance from the main lift pivot point. When actuated, the hydraulic lift forces the rotation of the lift platform about the pivot pin to a maximum 60° displacement. Additionally, there is a safety pin mounted on the elevated rear portion of the base that slides in and out and that acts as a safety device in case of hydraulic jack failure when the lift is in full up position. This allows for easy and safe access to the underside of the mower for maintenance and repair.

A primary object of the present invention is to provide a means of easily lifting small vehicles such as tractor mowers for the purpose performing underside repairs and maintenance.

Another object of the present invention is to provide a safe means of lifting small vehicles such as tractor mowers for the purpose of performing underside repairs and maintenance.

Yet another object of the present invention is to provide a stable means of lifting small vehicles such as tractor mowers for the purpose of performing underside repairs and maintenance.

Still yet another object of the present invention is to provide a means of lifting small vehicles such as tractor mowers for the purpose of performing underside repairs and maintenance conveniently.

Yet another object of the present invention is to provide a means of quickly lifting small vehicles such as tractor mowers for the purpose of performing underside repairs and maintenance.

Yet still another object of the present invention is to provide a means of lifting small vehicles such as tractor mowers for the purpose of performing underside repairs and maintenance with confidence.

Yet still another object of the present invention is to provide a portable means of lifting small vehicles such as tractor mowers for the purpose of performing underside repairs and maintenance.

Additional objects of the present invention will appear as the description proceeds.

The present invention overcomes the shortcomings of the prior art by providing a completely self-contained moveable and stabile lifting device, i.e., the equipment being lifted is completely contained within the device and the lifting action is relative to the base which completely supports the load. There is no tendency for dangerous differences to occur between the load and the lifting device since there is no load sharing between the device and the surface on which the load rests. This eliminates one source of instability caused by less-than-perfect surface conditions. The present invention also assures side-to-side stability by providing anti-tilt extension members on either side of the base. Given the above built in features, normal differences in grade do not compromise the stability, safety or lifting capability of the present invention as they do in devices typical of prior art. To add further convenience to the lift, two rear wheels are added to the anti-tilt extension members to provide mobility for porting the lift.

The Mower Lift assembly consists of two subassemblies: the base assembly and the lift platform assembly. The lift platform assembly is secured to the base assembly by a pivot pin located at one end within the anti-tilt extension members. The lifting action of the platform is angular to the base and is accomplished through a hydraulic lifting device which is pivotally anchored to the base as well as to the lifting platform structure a short distance from the main lift pivot point. When actuated, the hydraulic lift forces the rotation of the platform about the pivot pin to a maximum 60° displacement. Additionally, there is a stout pin mounted on the elevated rear portion of the base that slides in and out and that acts as a safety device in case of hydraulic jack failure when the lift is in full up position. This allows for easy and safe access to the underside of the mower for maintenance and repair.

The lifting platform subassembly consists of several smaller adjustable assemblies that allow the platform to adjust laterally and longitudinally to accommodate various sizes of riding mowers. These assemblies are as follows: the front-wheel, ramp assembly which consists of two laterally adjustable ramp platform members for the right and left front wheels attached to a central link plate, a T-shaped combination longitudinal and rear lateral adjustable beam assembly connected to it, which links the two, independent, rear-wheel, ramp assemblies and the said rear wheel assembly which is connected by another lateral adjustment beam between the two upright beam members attached to the aft portion of each individual ramp. These uprights act as the lifting structures for the platform and provide a place for the point of contact for the hydraulic jack to generate the moment arm for the pivoting action. The adjusting mechanisms are similarly configured beam assemblies (4 cross and 1 longitudinal) consisting of hollow, telescoping members that utilizes removable pins to adjustably secure to interior, beam members having cooperating indexed pin holes.

The base assembly consists of two independent longitudinal members, two upright quadrant side members attached thereto to which the safety pin and the hydraulic jack are anchored respectively, two combination anti-tilt/transport wheel frames which extend laterally from the former, and a long pivot pin which is assembled into either lateral portion of the wheel frame and secured with two pivot pin locking bolts and a centralized, pivot-pin, support block. In addition, all 4 mower wheels are also secured by similarly adjustable hold-down mechanisms attached to the lift platform fore and aft that prevent mowers with higher centers of gravity from possibly pivoting about the axis of the rear wheels as they are being lifted, tilting backwards and falling off the platform due to the shifting of the line of action of their centers of gravity to an unstable equilibrium position with respect to opposing forces of the lifting platform.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DESCRIPTION OF THE PREFERRED EMBODIMENT(S)

In order that the invention may be more fully understood, it will now be described, by way of example, with reference to the accompanying drawings in which FIGS. 1 through 14 illustrate the present invention being a small vehicle lift.

Figure 1:
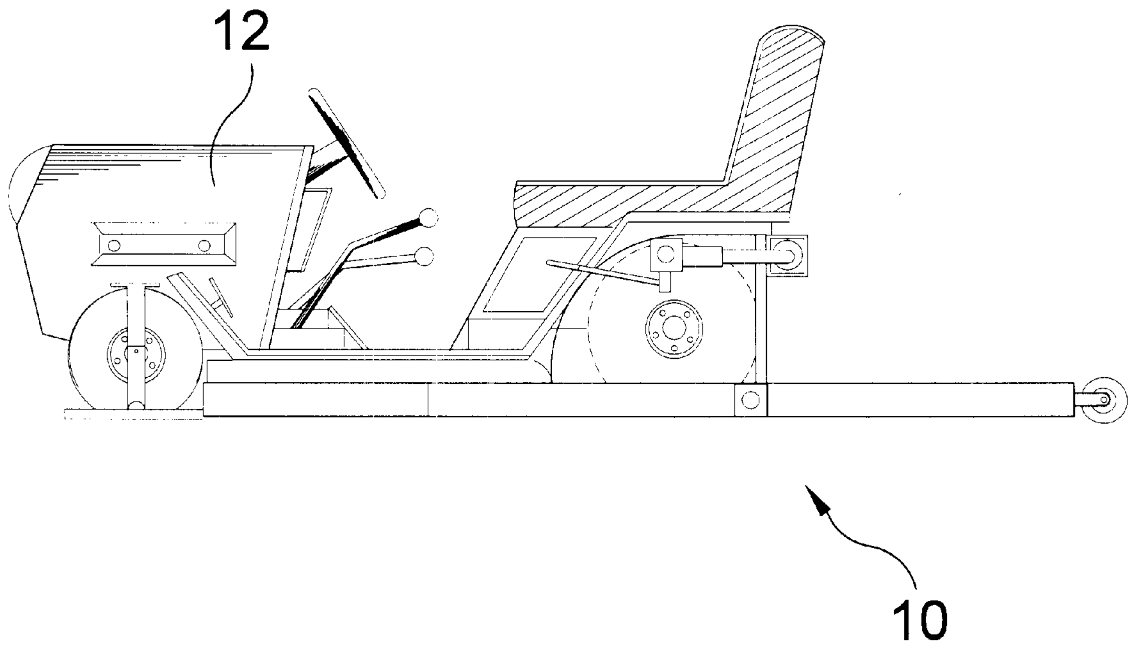
FIG. 1 is a side view of the present invention, the Mower Lifter, with a riding mower in position ready to be lifted.

Turning to FIG. 1, shown therein is a side view of the present invention 10, with a riding mower 12 in position ready to be lifted.

Figure 2:
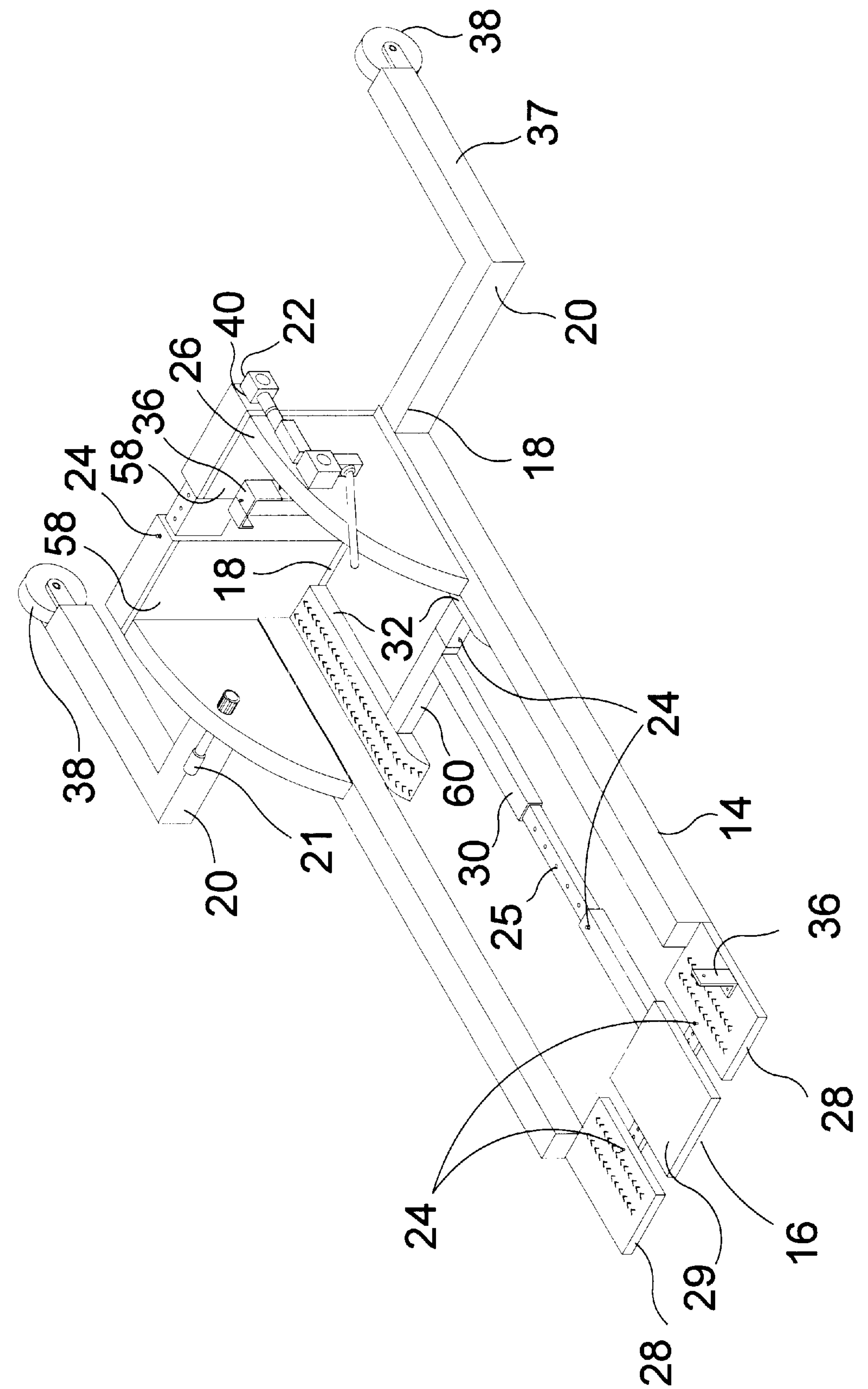
FIG. 2 is a front perspective view of the present invention in a non-lift configuration.

Turning to FIG. 2, shown therein is a front perspective view of the present invention 10 in a non-lift configuration. The present invention generally consists of two subassemblies: the two elongated horizontal base assembly 14 and the elongated lift platform assembly 16. The lift platform assembly 16 is secured to the base assembly 14 by a pivot pin 18 (not visible) located at one end within the anti-tilt extension members 20. The lifting action of the platform 16 is angular to the base 14 and is accomplished through a hydraulic lifting device 22 which is pivotally anchored at 18 to the base 14 as well as to the top of the rear end member 58 at 40 a short distance from the main lift pivot point 18. When actuated, the hydraulic lift 22 forces the rotation of the platform 16 about the pivot pin 18 to a maximum 60° angular displacement. Additionally, there is a stout safety pin 21 mounted on the elevated upright rear portion 26 of the base 14 that slides in and out and that acts as a safety device in case of hydraulic jack failure when the lift is in full up position. This allows for easy and safe access to the underside of the mower for maintenance and repair.

The lifting platform subassembly 16 consists of several smaller adjustable assemblies that allow the platform to adjust laterally and longitudinally to accommodate various sizes of riding mowers. These assemblies are as follows: the front-wheel ramp assembly which consists of two laterally adjustable ramp platform members 28 for the right and left front wheels attached to a central link plate 29, a T-shaped combination longitudinal and rear lateral adjustable beam assembly 30 connected to it, which links the two, independent, rear-wheel, ramp assemblies 32 and the rear wheel assembly ramp 32 which is connected by another lateral adjustment beam 60 between the two upright rear end beam members 58 attached to the aft portion of each individual ramp 32. These uprights 58 act as the lifting structures for the platform 16 and provide a place for the point of contact for the hydraulic jack 22 to generate the moment arm for the pivoting action. The adjusting mechanisms are similarly configured beam assemblies (4 cross and 1 longitudinal) consisting of hollow, telescoping members that utilizes removable pins 24 to adjustably secure to interior, beam members having cooperating indexed pin holes 25.

The base assembly consists of two independent longitudinal members 20, two upright quadrant side members 26 attached thereto to which the safety pin 21 and the hydraulic jack 22 are anchored respectively, two combination anti-tilt/transport wheel frames 37 which are parallel to the base frame members 14 beyond the 90 degree elbow therein, with wheel 38 which extend laterally from the former, and a long pivot pin 18 (not visible) which is assembled into either lateral portion of the wheel frame 37 and secured with two pivot pin locking bolts and a centralized, pivot-pin, support block. In addition, all 4 mower wheels are also secured by similarly adjustable hold-down mechanisms 36 attached to the lift platform fore and aft that prevent mowers with higher centers of gravity from possibly pivoting about the axis of the rear wheels as they are being lifted, tilting backwards and falling off the platform 16 due to the shifting of the line of action of their centers of gravity to an unstable equilibrium position with respect to opposing forces of the lifting platform.

Figure 3:
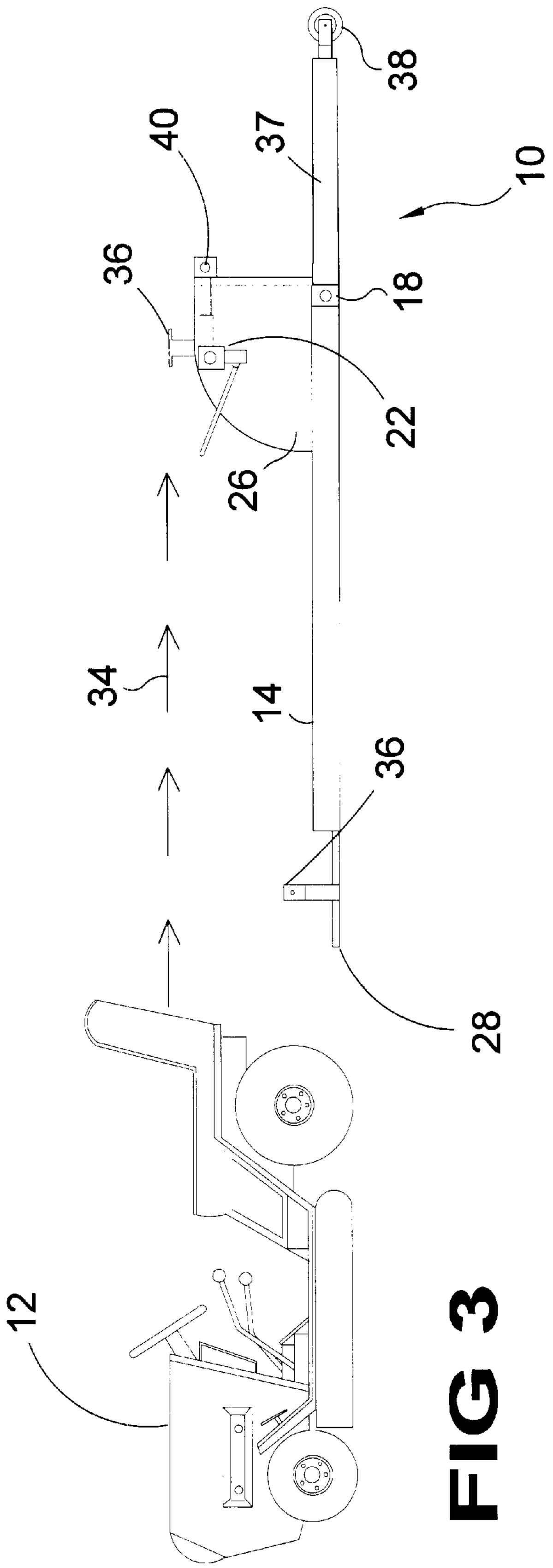
FIG. 3 is a side view of a riding mower backing into lifting position on the present invention, the Mower Lifter.

Turning to FIG. 3, shown therein is a side view of a riding mower 12 backing into lifting position on the present invention 10, as shown by arrows 34. Shown is the mower lift 16 and wheel locks 36. Also shown are the hydraulic cylinder 22 and pivot point 40. Elements previously disclosed are also shown.

Figure 4:
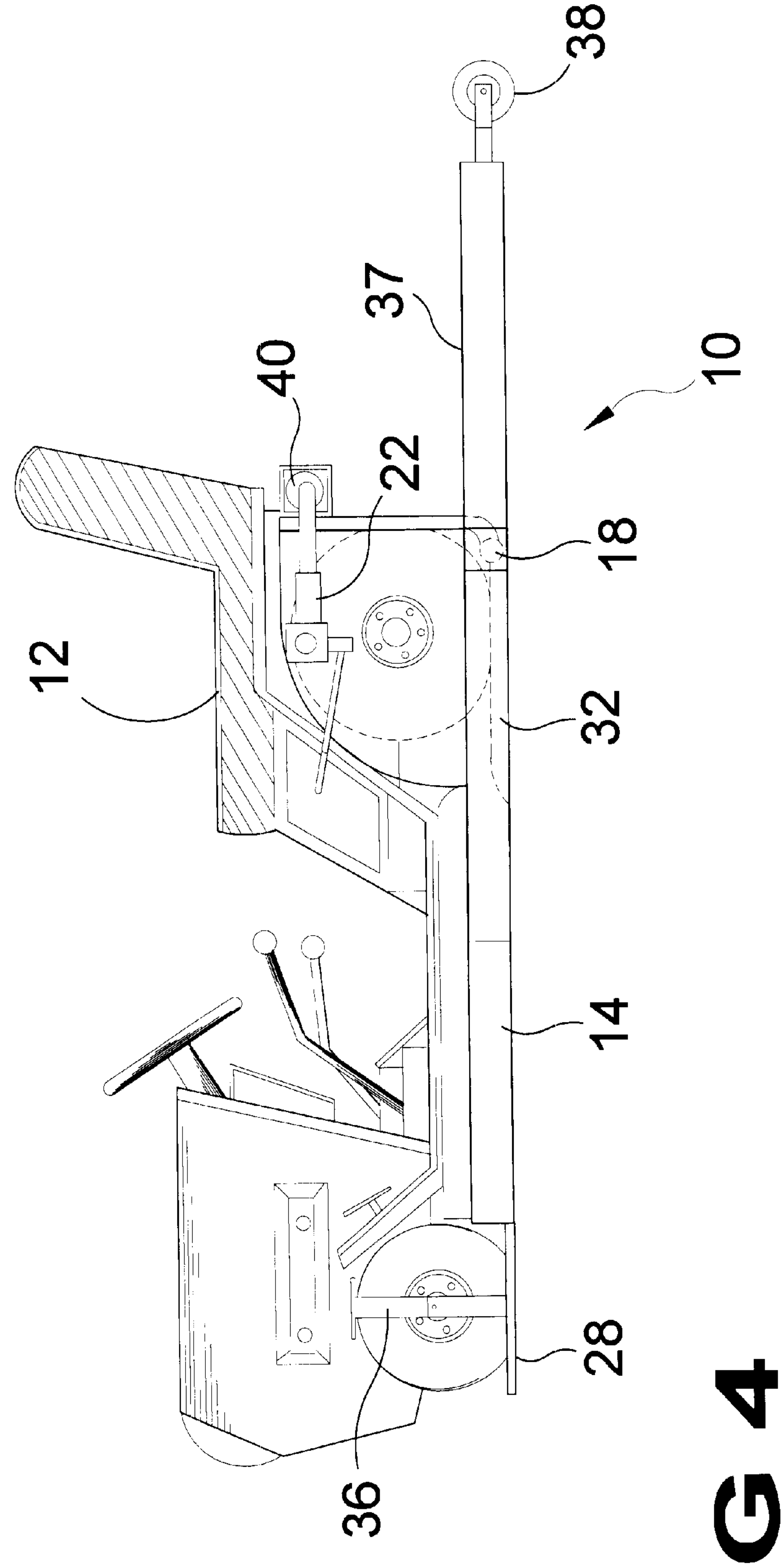
FIG. 4 is a side view of a riding mower backed into lifting position on the present invention, the Mower Lifter.

Turning to FIG. 4, shown therein is a side view of a riding mower 12 backed into lifting position on the present invention 10. Elements previously disclosed are shown.

Figure 5:
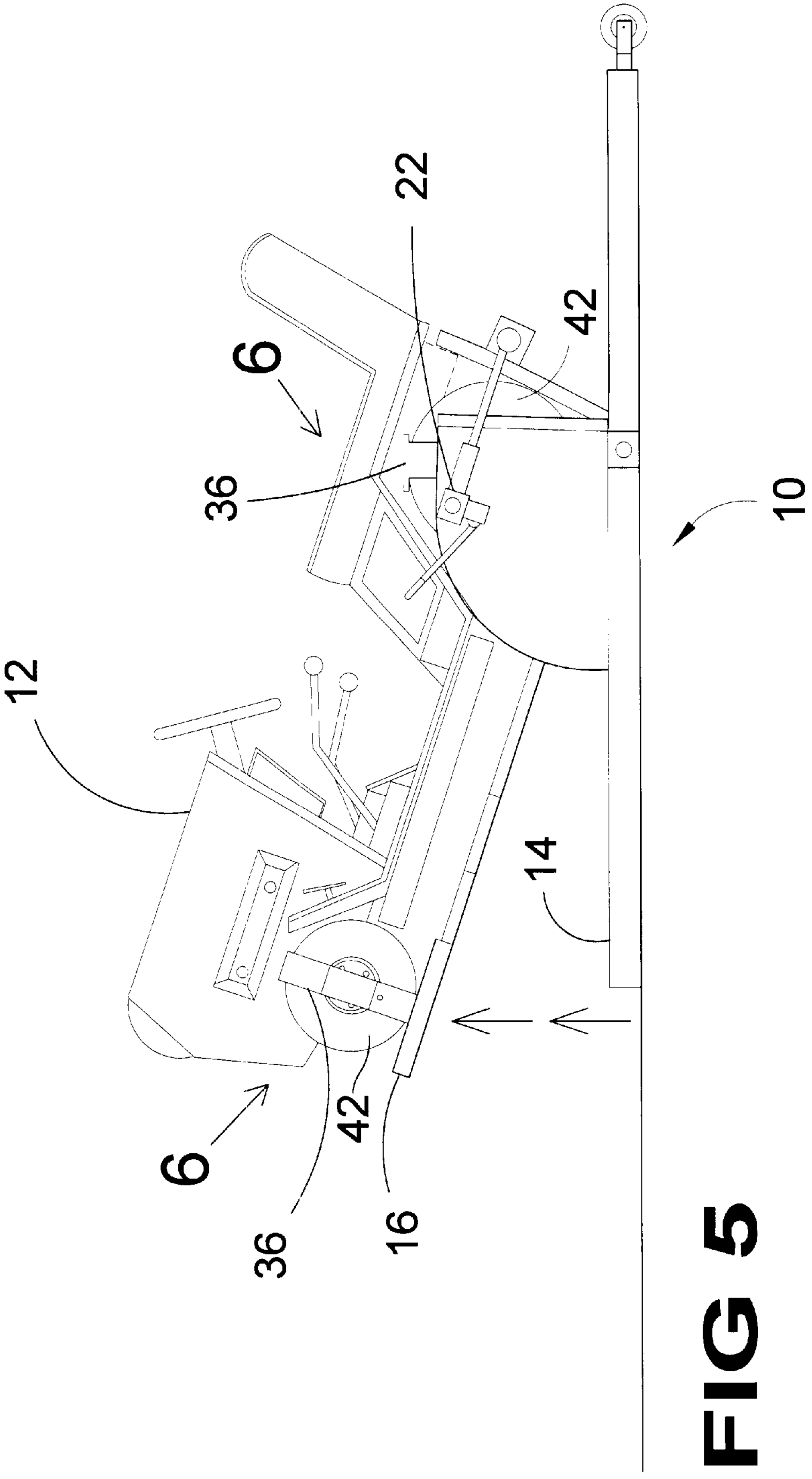
FIG. 5 is a side view of a riding mower showing the wheel locks of the present invention engaging the mower tires and the mower fully lifted by the present invention, Mower Lifter, through the action of the hydraulic jack.

Turning to FIG. 5, shown therein is a side view of a riding mower 12 showing the wheel locks 36 of the present invention 10 engaging the mower tires 42 and the mower 12 fully lifted by the present invention 10 through the action of the hydraulic jack 22. Elements previously disclosed are also shown.

Figure 6:
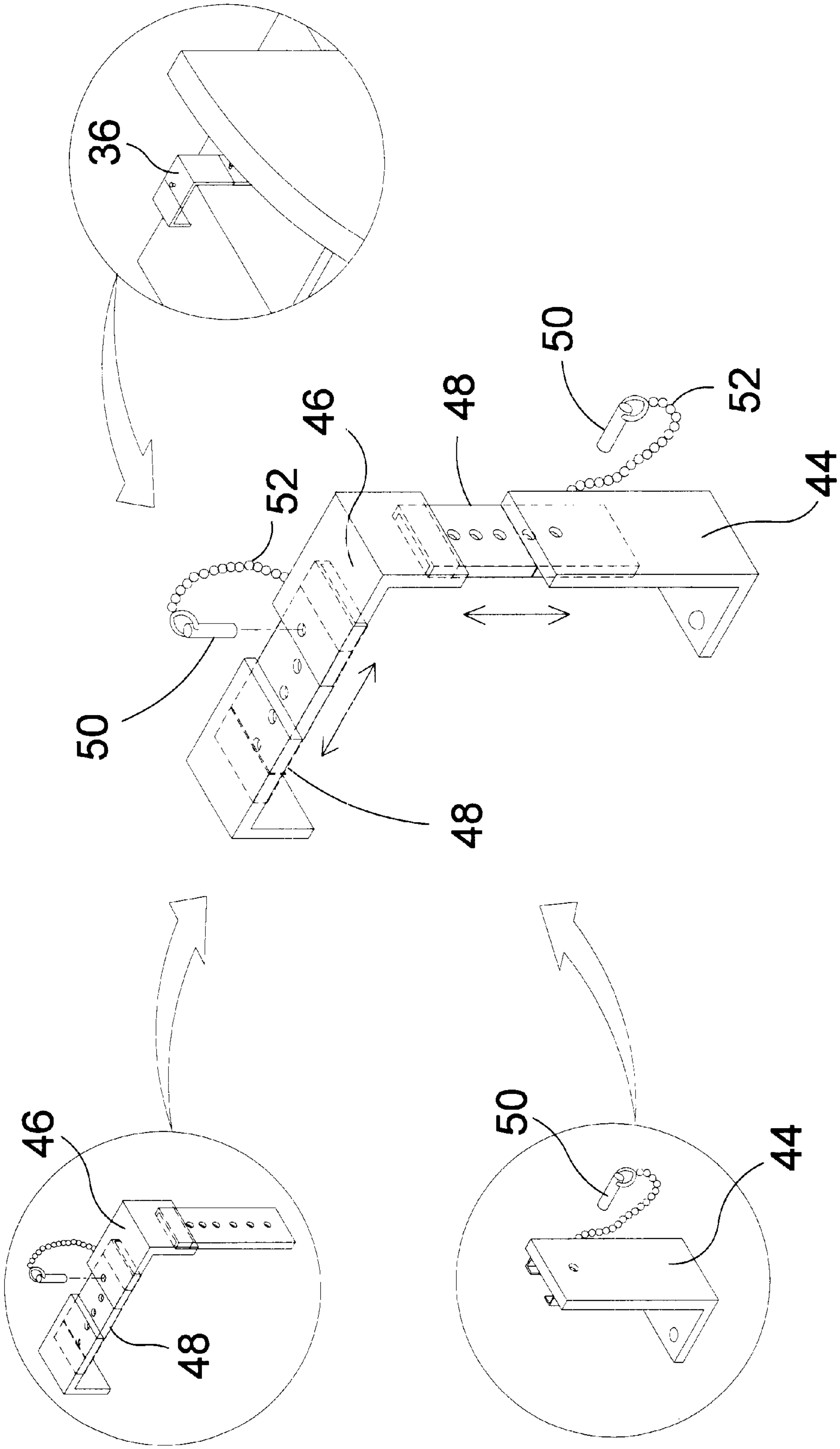
FIG. 6 is perspective view of the wheel locking mechanisms of the present invention showing the adjustment and locking action of its component parts.

Turning to FIG. 6, shown therein is a perspective view of the wheel locking mechanisms 36 of the present invention showing the adjustment and locking action of its component parts. Shown is a lower part 44, and upper part 46, sliding members 48, locking pins 50 and chains 52.

Figure 7:
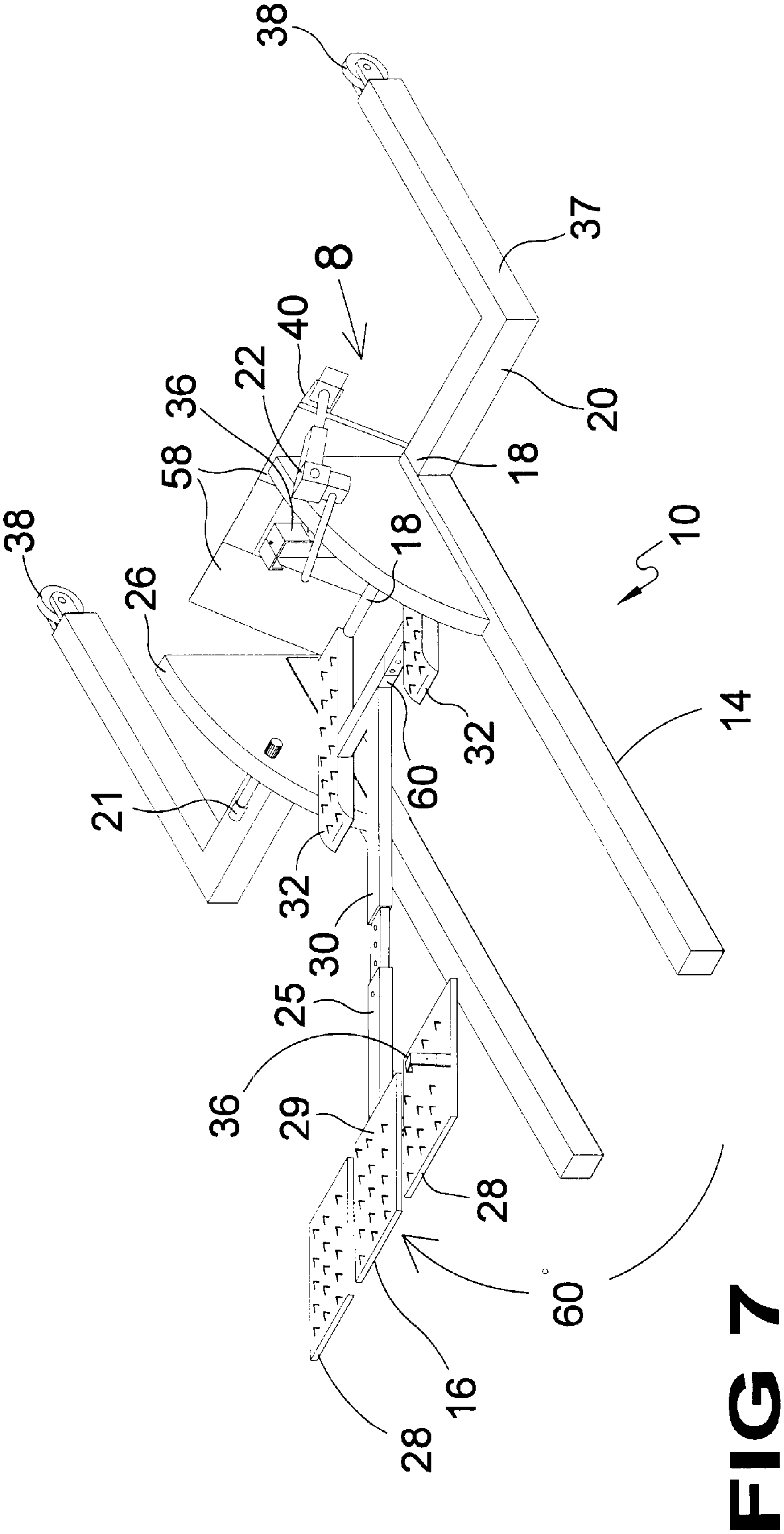
FIG. 7 is a front perspective view of the present invention in lift configuration.

Turning to FIG. 7, shown therein is a front perspective view of the present invention 10 in lift configuration. Shown are the base assembly 14 and the lift platform assembly 16. The lift platform assembly 16 is secured to the base assembly 14 by a pivot pin 18 (not visible) located at one end within the anti-tilt extension members 20. The lifting action of the platform 16 is angular to the base 14 and is accomplished through a hydraulic lifting device 22 which is pivotally anchored 40 to the base as well as to the top of the rear end member at 40 a short distance from the main lift pivot point 18. When actuated, the hydraulic lift forces the rotation of the platform 16 about the pivot pin to a maximum 60° displacement by pivoting the upright rear end member away from the upright base frame member. The hydraulic lift 22 also has a control means or actuator 64 whereby the user controls the hydraulic lift in the manner as would be done by one skilled in the art. Additionally, there is a stout safety pin 21 mounted on the elevated rear portion 26 of the base that slides in and out and that acts as a safety device in case of hydraulic jack failure when the lift 16 is in full up position. This allows for easy and safe access to the underside of the mower for maintenance and repair.

The lifting platform subassembly 16 consists of several smaller adjustable assemblies that allow the platform to adjust laterally and longitudinally to accommodate various sizes of riding mowers. These assemblies are as follows: the front-wheel, ramp assembly which consists of two laterally adjustable ramp platform members 28 for the right and left front wheels attached to a central link plate 29, a T-shaped combination longitudinal and rear lateral adjustable beam assembly 30 connected to it, which links the two, independent, rear-wheel, ramp assemblies 32 and the rear wheel assembly ramp 32 which is connected by another lateral adjustment beam 60 between the two upright beam members 58 attached to the aft portion of each individual ramp 32. These uprights 58 act as the lifting structures for the platform 16 and provide a place for the point of contact for the hydraulic jack 22 to generate the moment arm for the pivoting action. The adjusting mechanisms are similarly configured beam assemblies (4 cross and 1 longitudinal) consisting of hollow, telescoping members that utilizes removable pins 24 (not shown) to adjustably secure to interior, beam members having cooperating indexed pin holes 25.

The base assembly consists of two independent longitudinal members 20, two upright quadrant side members 26 attached thereto to which the safety pin 21 and the hydraulic jack 22 are anchored respectively, two combination anti-tilt/transport wheel frames 37 with wheel 38 which extend laterally from the former, and a long pivot pin 18 which is assembled into either lateral portion of the wheel frame and secured with two pivot pin locking bolts and a centralized, pivot-pin, support block. In addition, all 4 mower wheels are also secured by similarly adjustable hold-down mechanisms 36 attached to the lift platform fore and aft that prevent mowers with higher centers of gravity from possibly pivoting about the axis of the rear wheels as they are being lifted, tilting backwards and falling off the platform 16 due to the shifting of the line of action of their centers of gravity to an unstable equilibrium position with respect to opposing forces of the lifting platform.

Figure 8:
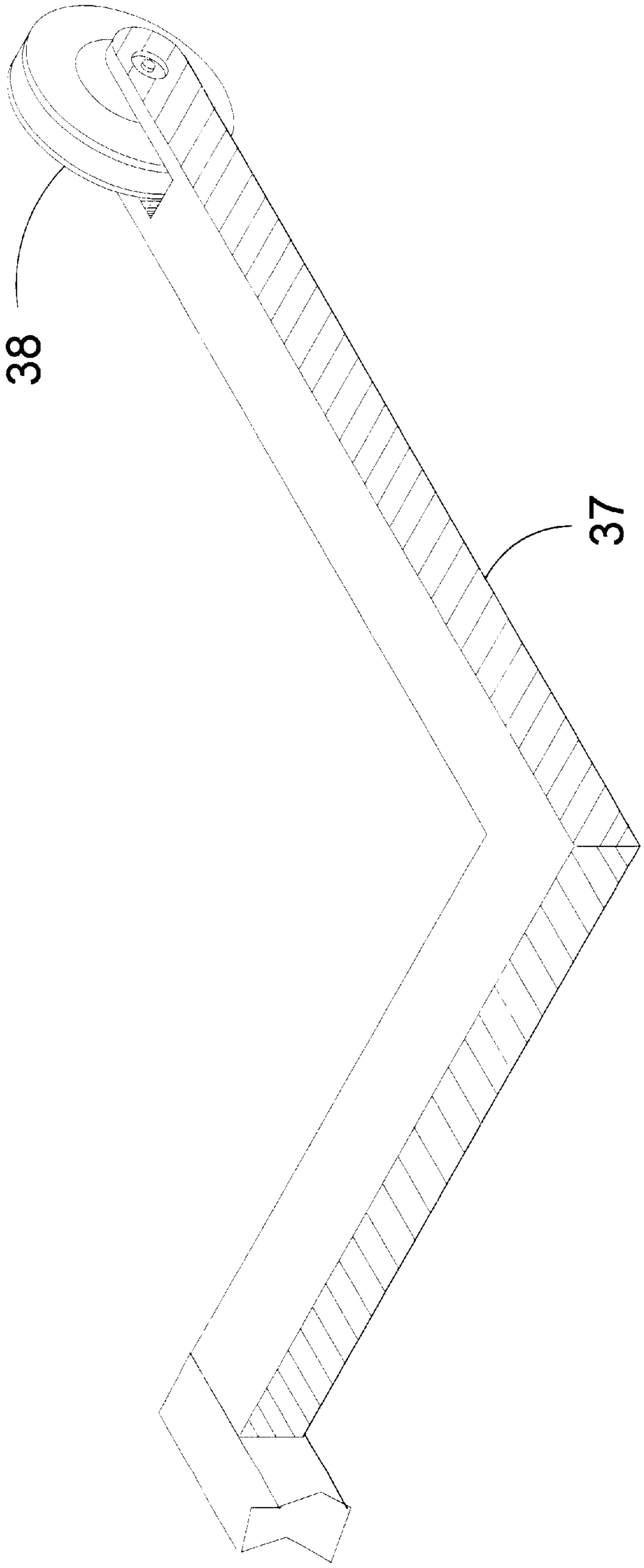
FIG. 8 is a perspective view of the transport wheel.

Turning to FIG. 8, shown therein is a perspective view of the transport wheel 38 and frame 37.

Figure 9:
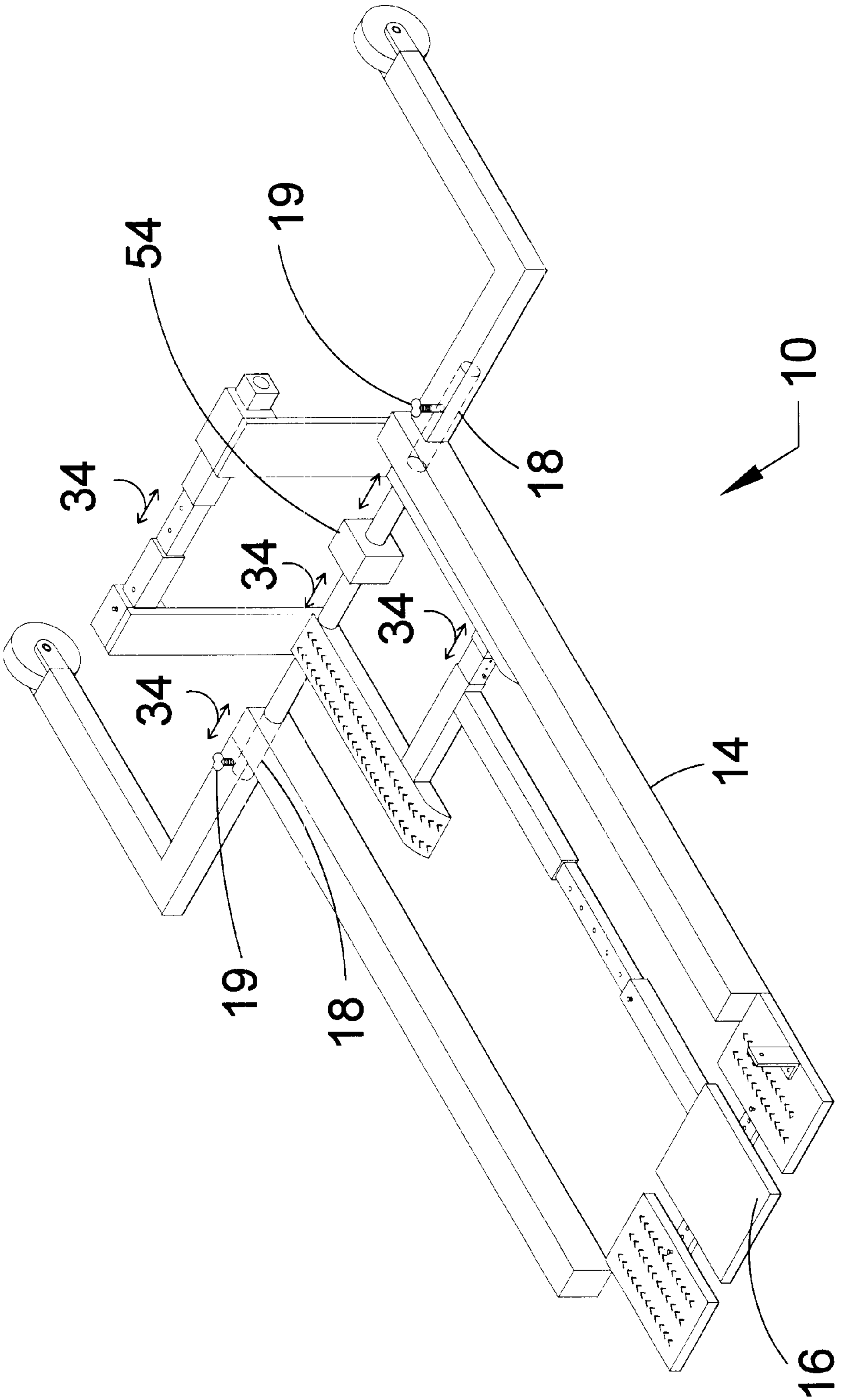
FIG. 9 is a partial perspective view of the present invention showing the adjustable features of the base and lifting platform assemblies.

Turning to FIG. 9, shown therein is a partial perspective view of the present invention 10 showing the adjustable features of the base 14 and lifting platform assemblies 16: Shown are pivot point 18 and locking means 19 along with pivot pin support 54. Arrows 34 indicate the adjustability of various members.

Figure 10:
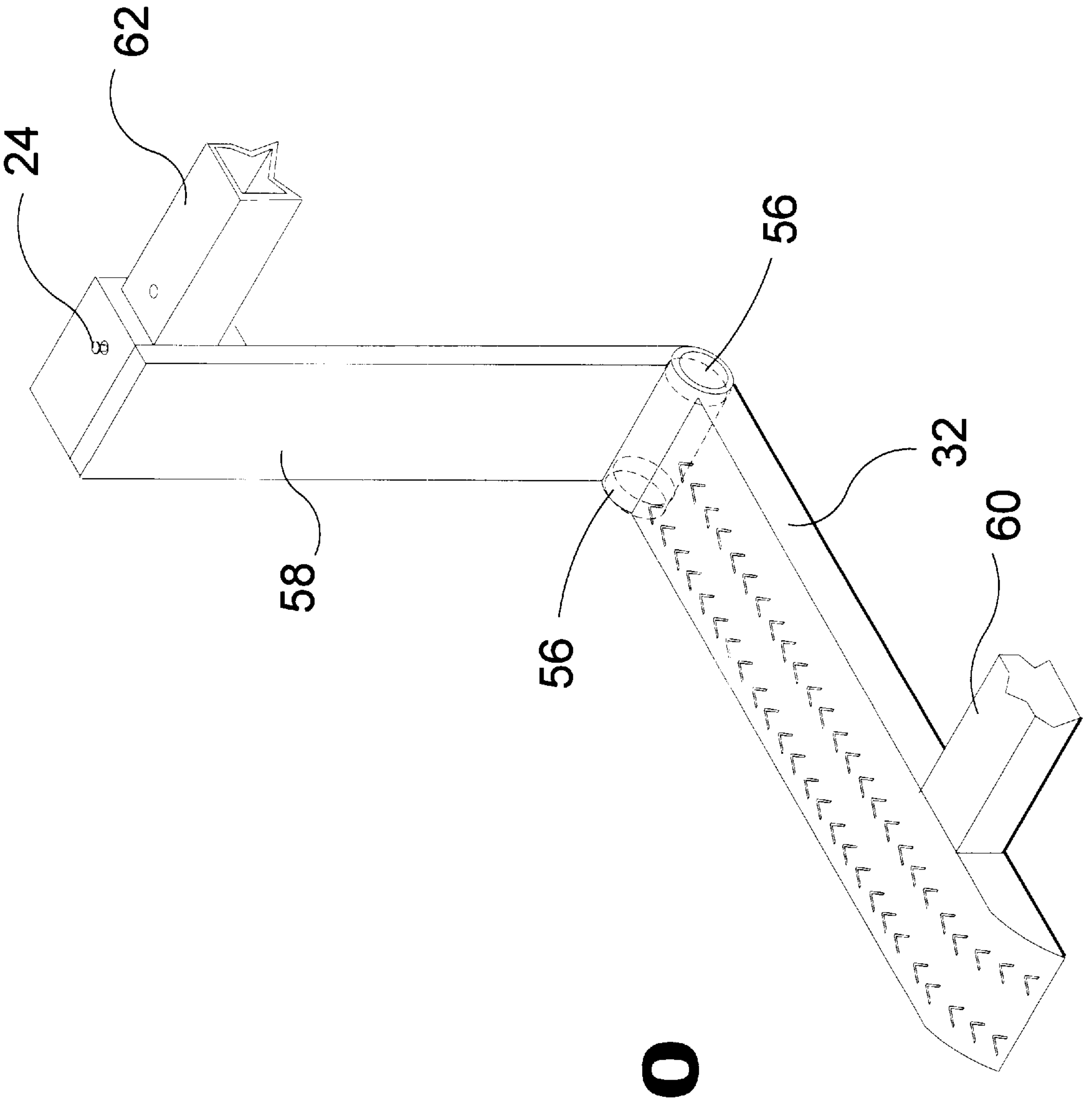
FIG. 10 is a detail perspective view of the left-side, rear-wheel ramp of the present invention showing the pivot-pin, bearing assembly.

Turning to FIG. 10, shown therein is a detail perspective view of the left-side of the right rear-wheel ramp 32 of the present invention showing the pivot-pin, with oilite bearing assembly 56 and lateral adjustment member 62 with pin 24. Elements previously disclosed are also shown.

Figure 11:
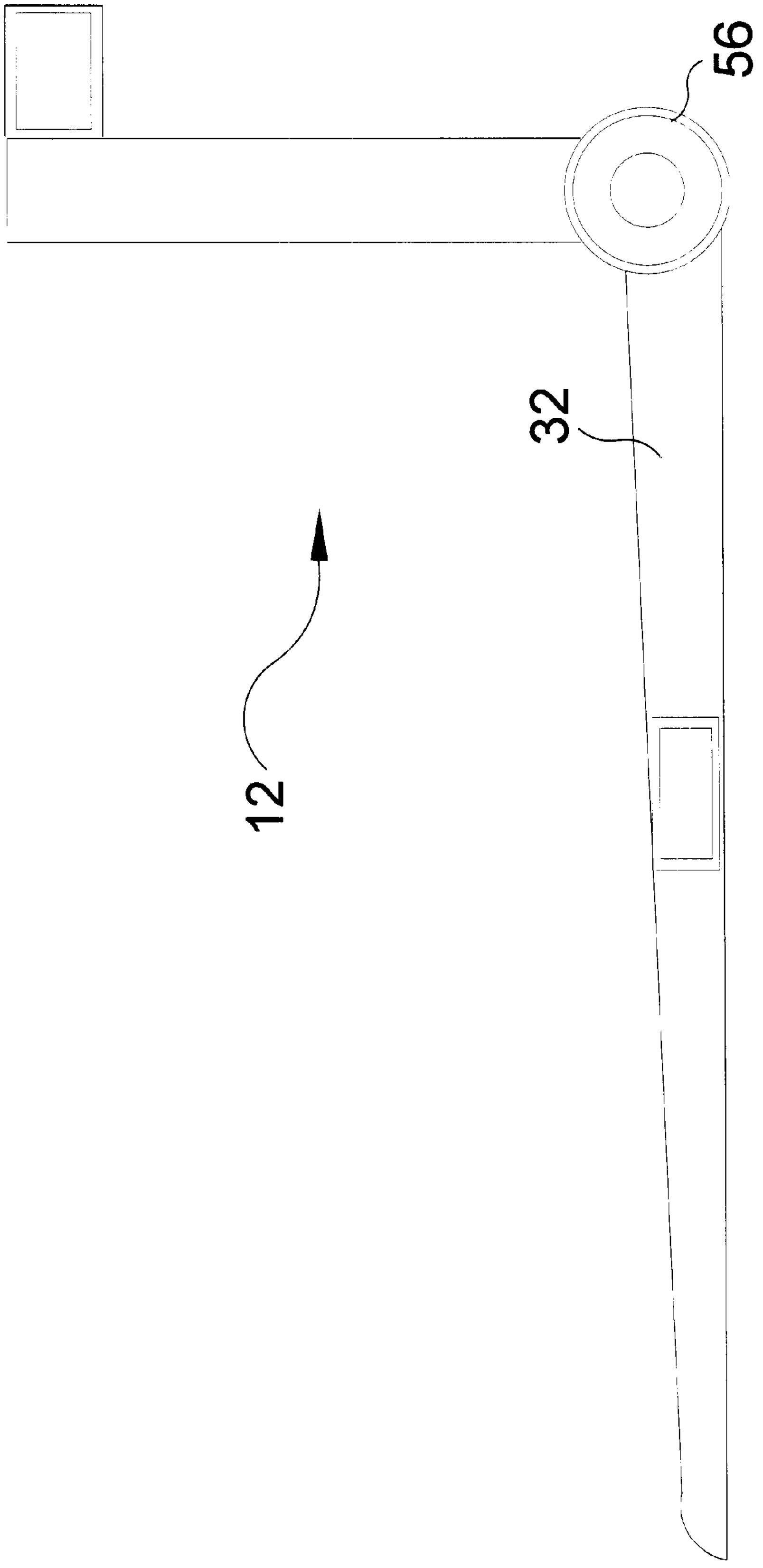
FIG. 11 is a detail side view of the rear-wheel ramp of the present invention taken from FIG. 10.

Turning to FIG. 11, shown therein is a detail side view of the rear-wheel ramp 32 of the present invention taken from FIG. 10 with bearing assembly 56.

Figure 12:
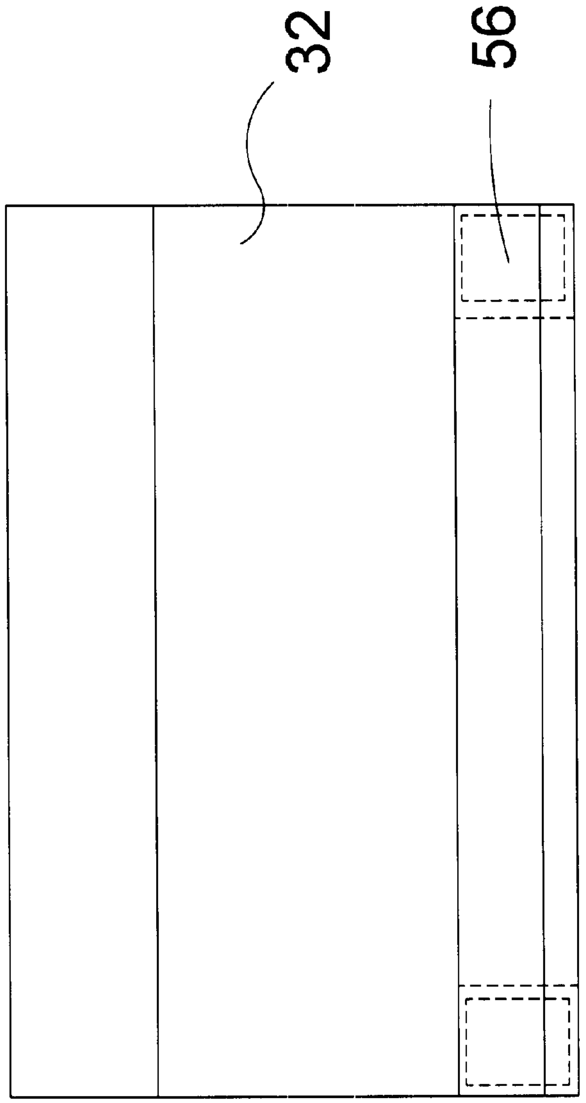
FIG. 12 is a detail front view of the rear-wheel ramp of the present invention taken from FIG. 11.

Turning to FIG. 12, shown therein is a detail front view of the rear-wheel ramp 32 of the present invention taken from FIG. 11 with bearing assembly 56.

Figure 13:
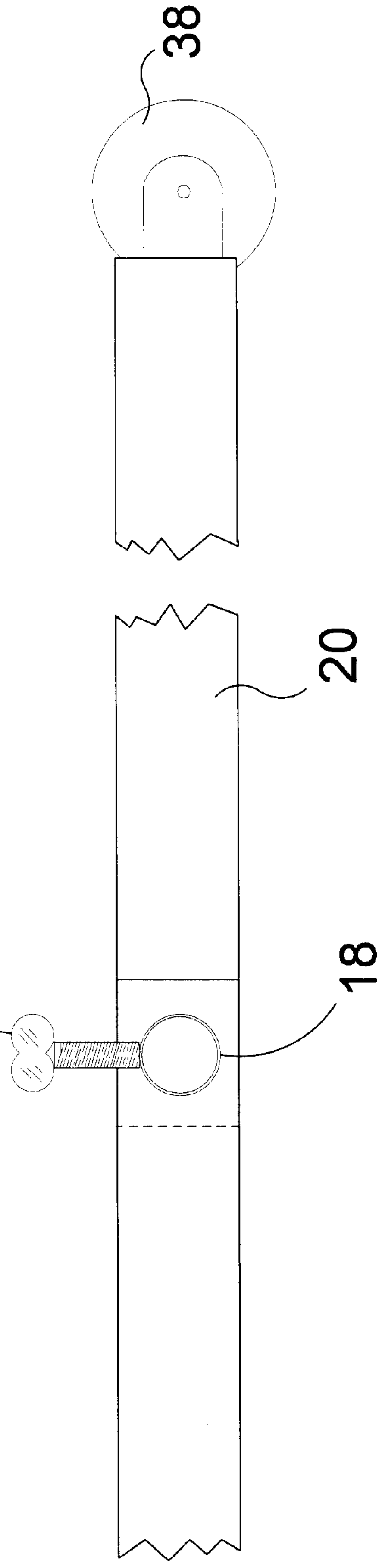
FIG. 13 is an enlarged detail left side view of the wheel frame of the present invention showing the pivot pin screw lock.

Turning to FIG. 13, shown therein is an enlarged detail left side view of the wheel 38 and frame 20 of the present invention showing the pivot pin 18 and screw lock 19.

Figure 14:
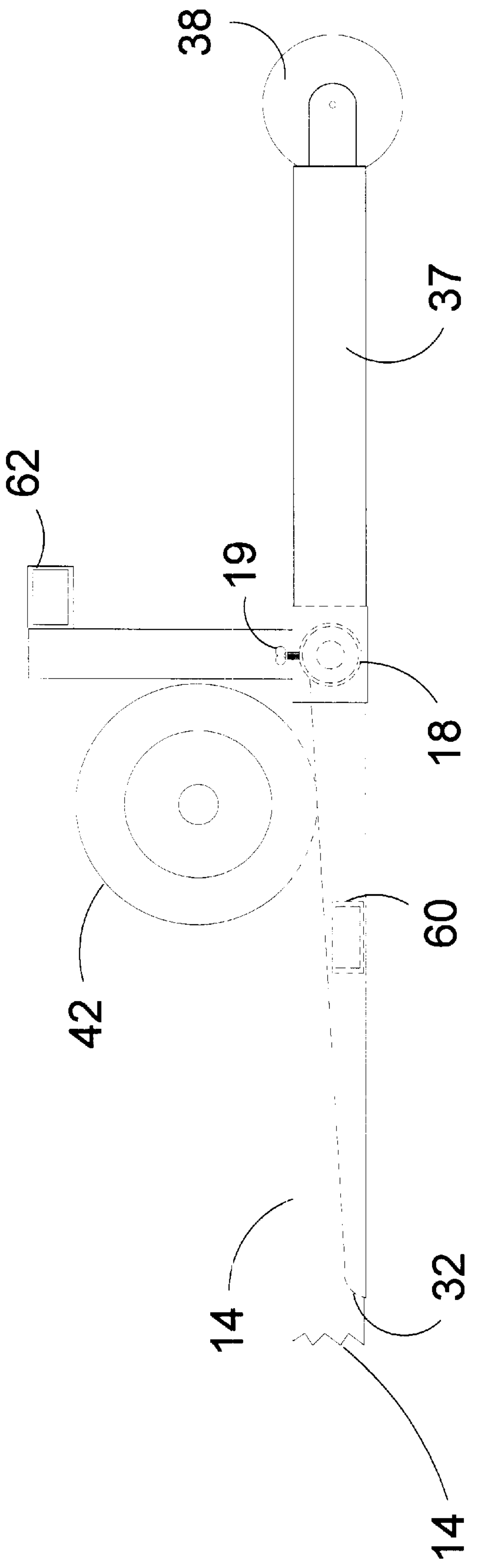
FIG. 14 is a partial left side view of the frame of the present invention showing the pivot pin screw lock.

Turning to FIG. 14, shown therein is a partial left side view of the frame 14 of the present invention showing the pivot pin 18, and screw lock 19 along with rear wheel ram 32 and rear mower wheel 42. Elements previously disclosed are also shown.

LIST OF REFERENCE NUMERALS

With regard to reference numerals used, the following numbering is used throughout the drawings.

10 present invention
12 riding mower
14 base assembly
16 lift platform assembly
18 lower pivot point
19 pivot pin lock
20 anti-tilt extension members
21 safety pin
22 hydraulic cylinder
24 pin for slide adjustment
25 pin hole
26 elevated rear portion of base
28 front wheel ramp
29 central link plate
30 adjustable beam
32 rear wheel ramp
34 direction arrows
36 wheel lock
37 wheel frame
38 transport wheel
40 upper pivot point
42 mower tires
44 lower part
46 upper part
48 sliding member
50 locking pins
52 chain
54 pivot pin support
56 oilite bearing
58 rear end assembly
60 adjustment beam
62 adjustment member
64 actuator

I claim:

1. An apparatus for lifting small vehicles, the vehicles having two front wheels and two rear wheels, comprising:

a) a pair of elongated horizontal base frame members being spaced apart, said base frame members resting on a foundation, said base frame members having a top side, a bottom side, an inner side, an outer side, a front end and a rear end;

b) a pair of elongated anti-tilt extension members extending laterally and perpendicularly from said outer side of said rear end of said base frame member, said extension members having a ninety-degree elbow therein wherein thereafter said elbow said extension member is parallel to said base frame member;

c) a pair of wheels disposed on the ends of said extension members distal said base frame member, said wheels for transporting the apparatus;

d) a pivot pin disposed between and connecting said rear end of said pair of base frame members and said pair of elongated anti-tilt extension members;

e) an elongated lifting platform disposed between said pair of base frame members, said lifting platform having a first end and a second end;

f) a pair of front ramps disposed on opposite sides of said first end of said lifting platform, said front ramps spaced apart for receiving the front two wheels of the small vehicle;

g) a pair of rear ramps disposed on opposite sides of said second end of said lifting platform, said rear ramps spaced apart for receiving the rear two wheels of the small vehicle, said rear ramps each having a first end and a second end, said first end of said rear ramp connected to said lifting platform, said second end of said rear ramp connected to said pivot pin;

h) a pair of upright rear end members connected to said pivot pin and to said second end of said rear ramps, said rear end member perpendicular to said rear ramps;

i) a pair of upright base frame members fixedly disposed on said top side of said rear end of said base frame members, said upright base frame members being substantially the same height above said base frame member as said upright rear end members; and, j) means for pivoting said upright rear end member away from said upright base frame member whereby said lifting platform becomes elevated.

2. The apparatus of claim 1, further comprising means for adjusting said first end and said second end of said lifting platform whereby said front ramps and said rear ramps are adjustably positioned apart horizontally from each other for receiving small vehicles of varying sizes.

3. The apparatus of claim 1, further comprising means for adjusting the length of said lifting platform.

4. The apparatus of claim 1, further comprising means for adjusting said pivot pin whereby the horizontal distance between said base frame members is adjusted.

5. The apparatus of claim 1, further comprising means for adjusting said upright rear end members whereby the horizontal distance between said members is adjusted.

6. The apparatus of claim 2, said means for adjusting further comprises an inner and an outer telescoping member cooperating with each other, said members having mating holes therein for receiving a mating pin.

7. The apparatus of claim 3, said means for adjusting further comprises an inner and an outer telescoping member cooperating with each other, said members having mating holes therein for receiving a mating pin.

8. The apparatus of claim 5, said means for adjusting further comprises an inner and an outer telescoping member cooperating with each other, said members having mating holes therein for receiving a mating pin.

9. The apparatus of claim 1, said rear end of said pair of base frame members having a first aperture disposed transversely therein, said pair of elongated anti-tilt extension members having a second aperture disposed longitudinally therein, said first and said second apertures coaxially aligned for receiving said pivot pin.

10. The apparatus of claim 9, said second aperture in said pair of elongated anti-tilt extension members having means for adjustably locking said pivot pin therein, whereby said pivot pin can be adjustably positioned therein.

11. The apparatus of claim 10, said means for adjustably locking said pivot pin further comprises said pair of elongated anti-tilt extension members having a transverse threaded aperture therein for receiving a mating threaded fastener for locking said pivot pin in place whereby the distance between said extension members is adjustable.

12. The apparatus of claim 10, said pivot pin further comprising an intermediately disposed support block for stabilizing said pivot pin.

13. The apparatus of claim 1, further comprising a central horizontal plate disposed on said first end of said lifting platform between said pair of front ramps.

14. The apparatus of claim 1, further comprising said upright base frame member having means for a safety pin disposed therethrough, whereby said member is secured in an elevated position.

15. The apparatus of claim 1, wherein said means for pivoting further comprises a means for a hydraulic cylinder having a first end and a second end, said first end fixedly disposed on said upright base frame member, said second end pivotally disposed on said upright rear end member distal said pivot pin.

16. The apparatus of claim 15, wherein said means for a hydraulic cylinder further comprises means for an actuator disposed thereon whereby said hydraulic cylinder can be controlled by a user.

* * * * *